United States Patent [19]

Tanaka et al.

[11] 3,869,092

[45] Mar. 4, 1975

[54] ENDLESS TAPE CARTRIDGE

[75] Inventors: Kimio Tanaka; Haruo Shiba, both of Tokyo, Japan

[73] Assignee: TDK Electronics Co., Ltd., Tokyo, Japan

[22] Filed: Oct. 23, 1973

[21] Appl. No.: 408,900

[30] Foreign Application Priority Data

Apr. 25, 1973 Japan .......................... 48-48671[U]

[52] U.S. Cl. ............................................ 242/55.19 A

[51] Int. Cl. ............................................ B65h 17/48

[58] Field of Search ............ 242/55.19 A, 197, 198, 242/199, 200; 360/90, 93

[56] References Cited

UNITED STATES PATENTS

| | | | |
|---|---|---|---|
| 2,922,642 | 1/1960 | Cousino | 242/55.19 A |
| 2,951,654 | 9/1960 | Steelman | 242/55.19 A |
| 3,161,362 | 12/1964 | Smith | 242/55.19 A |
| 3,638,874 | 2/1972 | Naito et al. | 242/55.19 A |
| 3,773,272 | 11/1973 | Wallace | 242/55.19 A |

*Primary Examiner*—Billy S. Taylor
*Attorney, Agent, or Firm*—Seidel, Gonda & Goldhammer

[57] ABSTRACT

An endless tape cartridge includes a reel adapted for carrying an endless roll of tape; an arresting lever which is provided with a recess and which is adapted for slidable engagement with the cartridge along a path radial to the reel; and a clamping lever which is pivotally mounted to the cartridge and which is adapted for securely engaging the arresting lever recess. The cantilever is pivotably released from contact with the reel in response to sliding movement of the arresting lever toward the reel.

8 Claims, 4 Drawing Figures

ENDLESS TAPE CARTRIDGE

BACKGROUND OF THE INVENTION

The present invention relates to an endless tape cartridge and, more particularly, to an endless tape cartridge adapted for preventing the rotation of an endless roll of tape when the cartridge is not being used.

Endless tape cartridges find wide use in automobiles and home stereo equipment. These cartridges are often stored in an automobile. When not in use, the cartridge stored in a moving automobile may be subjected to intense mechanical vibrations. Similarly, during handling in the home the cartridge may be subjected to jarring external forces. Any mechanical vibration is transmitted to the reel and the endless roll of tape thereon. As a result, the reel and tape may rotate. The rotation of the reel and tape can result in damage to the tape and failure of the reel to rotate upon subsequent use of the cartridge.

Many schemes have been proposed in the prior art for preventing the rotation of the reel despite mechanical vibration of the cartridge. However, none of these schemes precludes the tape from sagging or loosening at the outer periphery of the roll of tape. When the loosened portion of tape becomes sufficiently large it may protrude through the front opening of the cartridge. As a result, the tape will be exposed to external forces which may rupture the tape. Moreover, upon insertion of the cartridge into a tape machine the loose tape may become entangled with the capstan or the pinch roller of the machine, causing damage to the tape.

Accordingly, the principal advantage of the present invention is that it provides a novel means for clamping an endless roll of tape so that the tape cannot loosen at the outer periphery of the roll.

Another advantage of the present invention is that it provides a novel clamping lever pivotally mounted to the endless tape cartridge and pivoted by the linear reciprocating motion of an arresting lever.

Other objects will appear hereinafter.

BRIEF SUMMARY OF THE INVENTION

The deficiencies in the prior art which are enumerated above are overcome by the endless tape cartridge of the present invention. In sharp contrast to the prior art, the present invention comprises an arresting lever adapted for linear reciprocating motion along a path radial to the reel. The arresting lever includes a recess having oblique walls. In particular, the recess includes a locking wall and a camming wall. A clamping lever is pivotally mounted to the cartridge. The clamping lever includes a cantilever for clamping the endless roll of tape by directly contacting the top portion of the roll. In addition, the clamping lever includes a projection or finger adapted for engagement with the walls of the arresting lever recess. Specifically, the finger is adapted for secure engagement with the locking wall of the recess and for slidable engagement with the camming wall of the recess. Urging means are provided for urging the clamping lever ridge into secure engagement with the recess.

The linear reciprocating motion of the arresting lever governs the mode of engagement of the clamping lever finger with the arresting lever recess. In particular, motion of the arresting lever towards the center of the reel will result in slidable engagement of the finger and recess. As the arresting lever is moved towards the reel center, the finger slides upwardly along the camming wall of the recess and the clamping lever is pivoted away from the reel. As a result, the cantilever is released from direct contact with the endless roll of tape. Motion of the arresting lever in an opposite direction, that is, in a direction away from the reel center, will result in secure engagement of the finger with the locking wall of the recess. Corresponding to this mode of engagement, the cantilever is in direct physical contact with the endless roll of tape, clamping the roll of tape in position.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
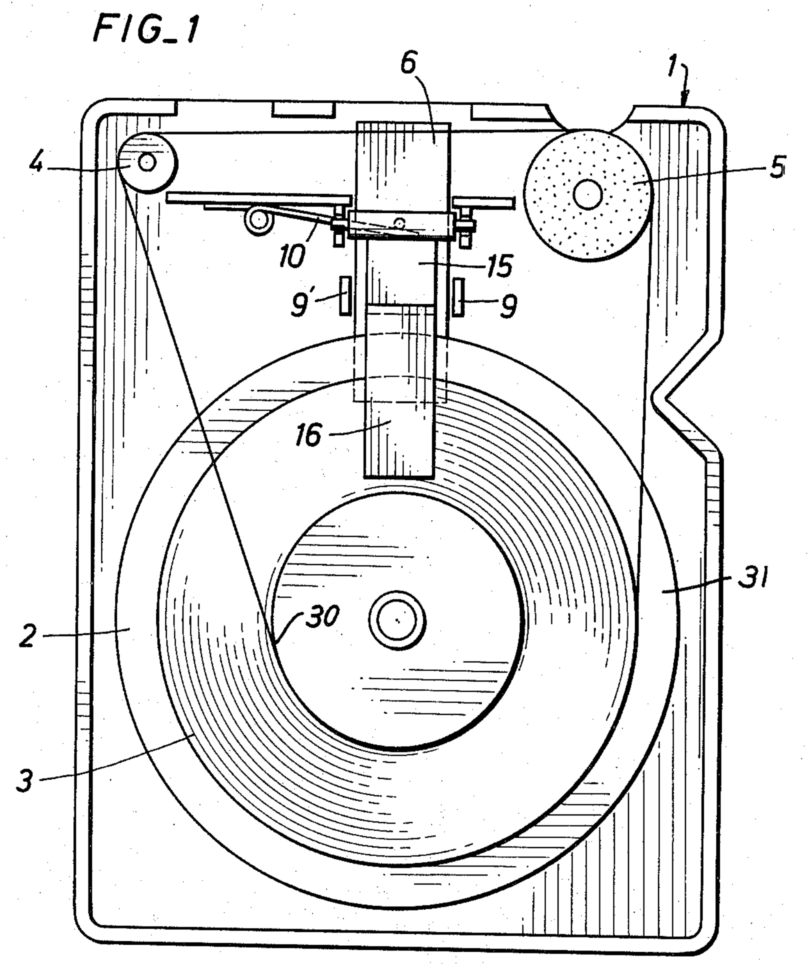
FIG. 1 is a plan view of an endless tape cartridge constructed in accordance with the principles of the present invention.
Figure 2:
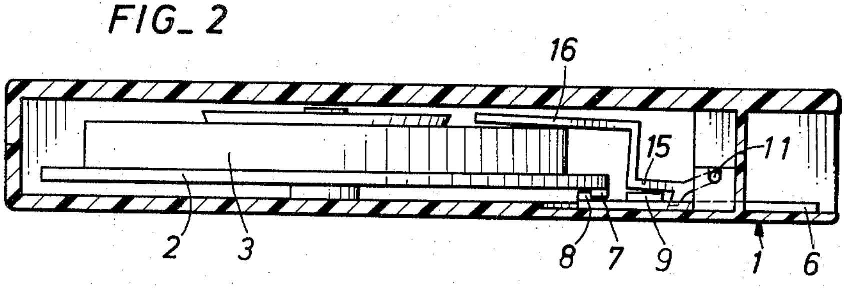
FIG. 2 is a view in cross-section of the endless tape cartridge of the present invention.

Referring to the drawings in detail, wherein like numerals indicate like elements, FIG. 1 shows an endless tape cartridge 1 constructed in accordance with the principles of the present invention. Reel 2 is rotatably mounted on cartridge 1. Mounted on reel 2 is an endless roll of tape 3. As shown, the endless roll of tape feeds guide roller 4. The tape spans guide roller 4 and pinch roller 5, returning to the outer periphery of endless roll of tape 3. In this manner, an endless loop of tape is established. Guide roller 4 is fed with tape emanating from feeding point 30 located along the inner periphery of the endless roll 3. The tape which spans guide roller 4 and pinch roller 5 returns to the endless roll 3 at accepting point 31 located along the outer periphery of endless roll 3. Due to the difference between the angular speed of the reel at feeding point 30 and the angular speed of the reel at accepting point 31, there is no sag in the span of the tape during normal operation of the cartridge.

Upon removal of the cartridge from a tape machine, the reel 2 rotates in response to a mechanical shock unless the reel 2 is fettered. If the reel 2 rotates in response to the mechanical shock, the feeding point 30 shifts. Upon subsequent insertion of the cartridge into a tape machine, the tape may be damaged or the reel 2 may fail to rotate during operation of the tape machine.

Figure 3:
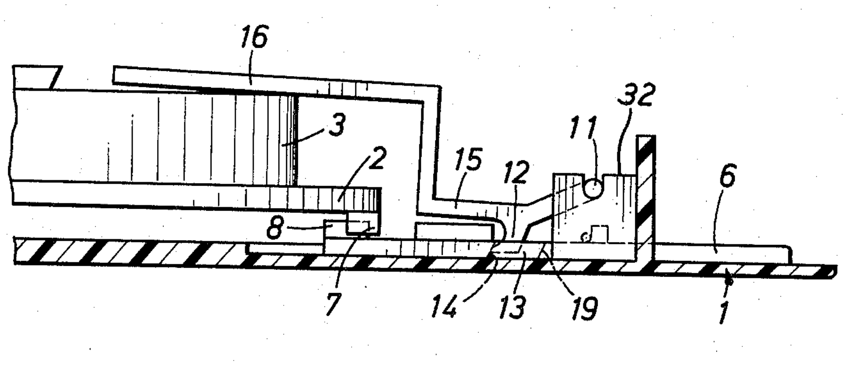
FIG. 3 is a partial view in cross-section of the endless tape cartridge of the present invention when the cartridge is not being used.

In order to prevent rotation of the reel 2 in response to external forces, an arresting lever 6 is slidably mounted on cartridge 1 as shown in FIG. 1. In a preferred embodiment, reel 2 includes a plurality of projections 7 spaced circumferentially and securely mounted on the underside thereof and arresting lever 6 includes at least one projection 8 securely mounted on the topside thereof. The shape of the reel projections 7 and the pattern in which they are mounted on the underside of reel 2 depends upon the shape and spacing of the lever projections 8. Specifically, the shape and the pattern of spacing of the respective projections are selected so that the lever projections 8 securely engage the reel projections 7 in locked contact as shown in FIG. 3. This relationship is more thoroughly explained in pending patent application Ser. No. 408,903, filed Oct. 23, 1973 entitled "Endless Tape Cartridge." The arresting lever 6 is constrained to linear reciprocating movement along a path radial to the reel 2 by guiding means 9 and 9'. In a preferred embodiment, guiding means 9 and 9' is a pair of shoulders securely mounted on the cartridge 1. Each shoulder is parallel to and on opposite sides of lever 6 as shown in FIG. 1. Urging means 10 urges the arresting lever 6 away from the center of reel 2 so that lever 6 securely engages reel 2 in locked contact. Urging means 10 is a spring. However, other devices which provide a constant force (also known as a bias force) also are suitable for use in the present invention.

According to the present invention, clamping lever 15 is pivotally mounted on cartridge 1. Clamping lever 15 includes cantilever 16 and projection or finger 12 as shown in FIG. 3. The cantilever 16 clamps the endless roll of tape 3 in a fixed position when cartridge 1 is not being used. Finger 12 extends downwardly from lever 15 and is adapted for engagement with a notch or recess 13 in arresting lever 6. Recess 13 is provided with oblique locking wall 14 and oblique camming wall 19, as shown in FIG. 3. Finger 12 is tapered in the direction of reel 2 in order to securely engage locking wall 14 when arresting lever projections 8 are in locked contact with reel projections 7. In addition, finger 12 is adapted to slidably engage camming surface 19 when arresting lever projections 8 are released from locked contact with reel projections 7.

Figure 4:
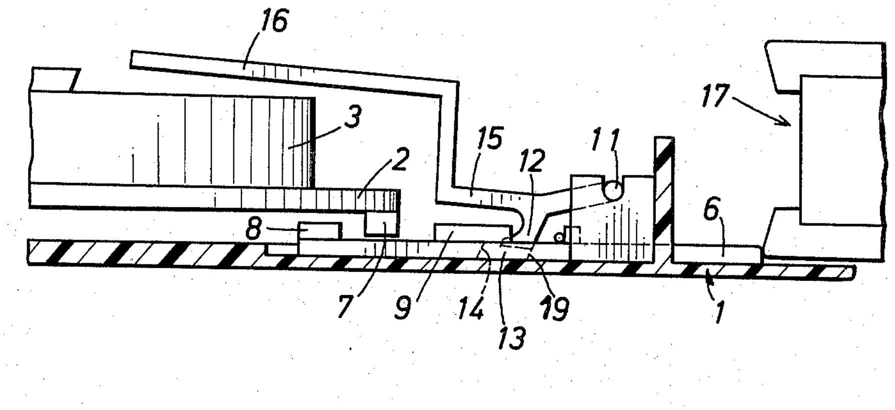
FIG. 4 is a partial view in cross-section of the endless cartridge of the present invention when the cartridge is being used in a tape machine.

The cartridge is adapted for use in a conventional tape machine (not shown). The machine has a tape head 17 as shown in FIG. 4. Upon insertion into the tape machine, lever 7 and reel 2 are released from locked contact when tape head 17 pushes lever 6 towards the center of reel 2, overcoming the bias force supplied by spring 10. As the lever 6 moves towards the center of the reel 2, finger 12 slidably engages camming wall 19, moving upwardly thereon. Clamping lever 15 pivots about fulcrum 11, raising cantilever 16 from endless roll of tape 3. Fulcrum 11 comprises a pin which is pivotally supported at both ends by bearings 32 securely mounted on cartridge 1.

When the cartridge is not being used, spring 10 urges arresting lever 6 away from the center of reel 2 such that ridge 12 securely engages locking wall 14. Clamping lever 15 is thereby pivoted towards endless roll of tape 3. Cantilever 16 is placed in direct physical contact with the top portion of endless roll 3. Thus, by the present invention the urging force is transmitted through arresting lever 6 to clamping lever 15, causing cantilever 16 to clamp endless roll 3 in fixed position. It is preferred that the cantilever directly contact the outer peripheral portion only of the top of the endless roll 3. As a result, roll 3 will remain fixed in position despite the condition of the windings thereon. More specifically, notwithstanding that the outer portion of the tape is loosely wound, the endless roll 3 is clamped in position.

When the cartridge is inserted in a tape machine, tape machine head 17 engages arresting lever 6, urging lever 6 towards the center of reel 2. As lever 6 slides toward the center of reel 2, reel projections 7 and lever projections 8 are released from locked contact and, simultaneously, finger 12 is released from secure engagement with locking wall 14. As lever 6 slides still closer to the center of reel 2, finger 12 slidably engages camming wall 19. With further movement of the lever 6 in the direction of the center of reel 2, finger 12 slides upwardly along camming wall 19. At the same time, clamping lever 15 pivots about fulcrum 11, raising cantilever 16 from endless roll 3. The final position of the clamping lever 15 is determined by a stopper means (not shown) mounted on cartridge 1.

As the cartridge 1 is withdrawn from engagement with the tape machine, arresting lever 6 slides away from the center of reel 2 due to the bias force provided by spring 10. Consequently, the finger 12 slides downwardly along the camming surface 19 and, at the same time, clamping lever 15 pivots about fulcrum 11 towards endless roll 3. The downward motion of finger 12 along camming surface 19 may be aided by the biasing force of a spring, if desired. As arresting lever 6 moves farther away from the center of reel 2, finger 12 becomes seated within recess 13. With further movement of arresting lever 6 away from reel 2, finger 12 securely engages locking wall 14. As finger 12 engages locking wall 14, cantilever 16 directly contacts the outer peripheral portion of the top of endless roll 3. Moreover, at this time reel projections 7 securely engage lever projections 8 in locked contact.

The present invention may be embodied in other specific forms without departing from the spirit or essential attributes thereof and, accordingly, reference should be made to the appended claims, rather than to the foregoing specification as indicating the scope of the invention.

We claim:

1. Apparatus comprising an endless tape cartridge; a reel rotatably mounted on said cartridge, said reel being adapted to carry an endless roll of tape; an arresting lever having structure for cooperation with a mating structure on said reel for arresting rotary movement of said reel, said arresting lever being slidably mounted on said cartridge for linear reciprocating motion along a path radial to said reel; a clamping lever pivotally mounted on said cartridge for clamping an endless roll of tape on said reel; and means extending between said levers for pivoting said clamping lever in a direction away from said reel in response to reciprocation of said arresting lever along said path toward said reel.

2. Apparatus in accordance with claim 1 wherein said means includes a recess on one of said levers and a projection on the other of said levers.

3. Apparatus in accordance with claim 2 wherein said recess includes a locking wall and a camming wall, said locking wall and said camming wall being angled with respect to the axis of said reel, said projection being adapted for secure engagement with said locking wall and for slidable engagement with said camming wall.

4. Apparatus in accordance with claim 2 wherein said arresting lever contains said recess, said projection being rigid with and extending from said clamping lever to said recess.

5. Apparatus in accordance with claim 1 wherein said clamping lever pivots about an axis at an elevation which is above the arresting lever, said means including a projection extending downwardly to the arresting lever at a location between said reel and said axis of pivotation for said clamping lever.

6. Apparatus in accordance with claim 1 wherein said structure on said arresting lever and said mating structure on said arresting lever are mating projections on juxtaposed surfaces of said reel and said arresting lever.

7. Apparatus in accordance with claim 6 wherein said mating projections are biased into contact by spring means on said cartridge.

8. Apparatus in accordance with claim 1 wherein said clamping lever is a cantilever.

* * * * *